United States Patent Office 2,758,131
Patented Aug. 7, 1956

2,758,131

STABILIZATION OF UNSATURATED NITRILES

Louis J. Couvillon, Texas City, Tex., assignor to Monsanto Chemical Company, St. Louis, Mo., a corporation of Delaware No Drawing. Application March 26, 1954,
Serial No. 419,099

10 Claims. (Cl. 260—465.9)

This invention relates to the stabilization of unsaturated nitriles. More specifically, this invention relates to the inhibition of the polymerization of alpha, beta-unsaturated nitriles.

The unsaturated nitriles, particularly the alpha, beta-unsaturated nitriles, are extremely useful chemical compounds. Considerable quantities of these materials are used for the preparation of synthetic rubbers and various types of synthetic resins. These materials, however, possess a characteristic which all too frequently hampers not only their utility, but also the purification techniques commonly employed in their preparation. All of these materials exhibit a tendency to polymerize when subjected to periods of storage and/or to elevated temperatures. Such polymerization results in a darkening of the unsaturated nitrile monomer and ultimately in the formation of solid polymer contaminant.

Since most applications or uses of the unsaturated nitriles require high-purity products, these polymerization characteristics present a serious problem in the preparation and storage of finished grade material. Furthermore, since distillation at elevated temperatures is the commonly used purification technique, purification is hampered by solid polymer formation which accumulates in the equipment, ultimately plugging the system. To add to this latter problem, impurities present in crude unsaturated nitriles are frequently of the type which accelerate polymerization. For example, acrylonitrile containing small quantities of acetaldehyde exhibits a greater tendency to polymerize than does relatively pure acrylonitrile.

Attempts to eliminate this problem have been made in the past by the addition of inhibitors which retard or prevent the polymerization of unsaturated nitriles. Unfortunately, the inhibitors heretofore used, while exhibiting some inhibitory effects, have not proven to be completely satisfactory. To be of practical utility, the inhibitor must not impart any undesirable color to the unsaturated nitrile, be sufficiently inhibitory to manifest its effect over extended periods of storage, inhibit polymer formation at elevated temperatures to permit utility in distillation purification techniques, and be readily separable from the unsaturated nitrile or inert in subsequent reactions of the inhibited product. The inhibitors heretofore used have not satisfied all of these requirements.

It is an object of this invention to provide an improved method for preventing or inhibiting the polymerization of unsaturated nitriles. It is a further object of this invention to provide an improved method for preventing the polymerization of unsaturated nitriles by the addition of an inhibitor which does not possess the deficiencies exhibited by the inhibitors heretofore used. A still further object of this invention is to provide novel stabilized compositions comprising an unsaturated nitrile and an added polymerization inhibitor, which then can be subjected to extended periods of storage or distillation at elevated temperatures without exhibiting any significant evidence of polymer formation. Further objects of this invention will become apparent from the description which follows.

It has been discovered that the polymerization of unsaturated nitriles, particularly the alpha, beta-unsaturated nitriles, can be successfully inhibited by mixing therewith a minor amount of ammonium nitroso-$\beta$-phenyl hydroxylamine (cupferron). It has been found that a composition comprising an unsaturated nitrile and a minor amount of ammonium nitroso-$\beta$-phenyl hydroxylamine will not exhibit any significant polymer formation on prolonged periods of storage or when subjected to temperatures commonly encountered during purification by distillation techniques.

The following examples illustrate the invention but are not to be construed as limiting it in any manner.

Example I

A 500-ml., round-bottomed flask equipped with a thermometer, stirrer, and sample entry tube is immersed in a constant temperature bath maintained at 35° C. In this is placed 150 ml. of water through which nitrogen is bubbled at a slow continuous rate. Then 0.1560 g. of NaHSO$_3$ is added and the mixture is allowed to attain thermal equilibrium. After equilibrium is reached, 10 g. of pure acrylonitrile is added followed by 0.405 g. of K$_2$S$_2$O$_8$. The mixture of sodium bisulfite and potassium persulfate serves as a polymerization accelerator. Polymerization is allowed to continue for at least one hour following the end of the induction period indicated by a slight turbidity developing in the mixture. After the hour has elapsed, the polymer formed is removed by filtration, washed with water and acetone, and dried at 77–83° C. Approximately 7.3 g. of polymer is obtained, indicating a polymer yield of approximately 73% based on acrylonitrile charged.

Example II

The procedure set forth in Example I is repeated three times with the exception that varying quantities of ammonium nitroso-$\beta$-phenyl hydroxylamine is added as inhibitor to the 150 ml. of water initially placed in the reaction vessel. Quantities employed are respectively 0.10 gram, 0.01 gram, and 0.003 gram. In each case, after an elapsed time of at least one hour, no polymer at all is formed in the system.

Example III

A sealed test tube containing 20 ml. of crude acrylonitrile containing 85–90% acrylonitrile, 3–7% water, 4–8% acetaldehyde, and small quantities of lactonitrile, HCN, cyanobutadiene and methyl vinyl ketone mixed with approximately 100 parts by weight of ammonium nitroso-$\beta$-phenyl hydroxylamine is stored at atmospheric temperature. No cloudiness or turbidity indicative of polymerization, nor significant discoloration becomes evident after an extended period of such storage.

Example IV

Samples of acrylonitrile, methacrylonitrile, crotononitrile, $\alpha$-ethylacrylonitrile, $\beta$-hexyl acrylonitrile, $\alpha,\beta$-dimethyl acrylonitrile, $\alpha$-furfuryl acrylonitrile, $\beta$-butyl acrylonitrile, $\beta$-(2-chloroethyl) acrylonitrile, $\beta$-ethyl acrylonitrile, $\alpha$-naphthyl acrylonitrile, $\alpha$-(2-chlorobutyl) acrylonitrile and $\alpha$-(4-hydroxy phenyl) acrylonitrile are stabilized by mixing therewith about 100 parts by weight of ammonium nitroso-$\beta$-phenyl hydroxylamine per million parts of the nitrile. After extended periods of storage at atmospheric temperatures, no significant discoloration or polymer formation is evident in these samples.

While the preceding examples have illustrated specific embodiments of this invention, obviously substantial variation is possible without departing from the scope thereof. For example, the quantity of ammonium nitroso-β-phenyl hydroxylamine used to inhibit the polymerization of the unsaturated nitrile can be varied widely, depending upon the particular nitrile to be stabilized and the degree of inhibition desired. In general, minor amounts of ammonium nitroso-β-phenyl hydroxylamine are used. An advantage of ammonium nitroso-β-phenyl hydroxylamine in such application as this is the fact that it can be used in extremely small quantities due to its strong inhibitory qualities. Concentration in the range of from about 0.5 to about 1,000 parts by weight of ammonium nitroso-β-phenyl hydroxylamine per million parts of the nitrile are highly preferred. These low concentrations afford adequate stability for most applications and greatly simplify subsequent processing of the nitrile. Of course, higher concentrations of the inhibitor in the nitrile can be used if desired, resulting in a nitrile monomer even more strongly inhibited against polymerization.

Ammonium nitroso-β-phenyl hydroxylamine can be used to stabilize unsaturated nitriles under any types of conditions. Thus, it can be used to inhibit polymer formation in unsaturated nitriles during storage under atmospheric conditions of light, air, temperature and pressure and during purification of the crude nitrile monomer. To inhibit polymer formation during distillation of the unsaturated nitrile, the inhibitor can be added to the feed stream to the column or introduced separately at some point in the distillation column. Preferably, the inhibitor is introduced at the top of the column to provide maximum inhibition throughout the entire system.

The alpha, beta-unsaturated nitriles, represented by the formula

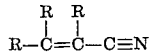

wherein the R's are the same or different and selected from the group consisting of hydrogen and alkyl radicals containing from one to eight carbon atoms, respond readily to the stabilizing effect of the inhibitor disclosed herein. Acrylonitrile, alpha-substituted acrylonitriles wherein the substituent on the alpha carbon atom is an alkyl radical containing from one to eight carbon atoms, and beta-substituted acrylonitriles wherein the substituent on the beta carbon atom is an alkyl radical containing from one to eight carbon atoms, represent a class of monomers which polymerize very readily, but can be most effectively inhibited against polymerization by means of ammonium nitroso-β-phenyl hydroxylamine.

When desired, separation of ammonium nitroso-β-phenyl hydroxylamine from the stabilized unsaturated nitrile monomer can be accomplished by any of a variety of simple techniques. For example, it can be extracted by means of a suitable solvent. Preferably, however, the unsaturated nitrile is distilled from the inhibited composition.

What is claimed is:

1. A composition comprising an unsaturated nitrile containing a minor amount of ammonium nitroso-β-phenyl hydroxylamine.

2. A composition comprising an alpha, beta-unsaturated nitrile containing a minor amount of ammonium nitroso-β-phenyl hydroxylamine.

3. A composition comprising a nitrile selected from the group consisting of acrylonitrile, the alpha-substituted acrylonitriles wherein the substituent on the alpha carbon atom is an alkyl radical containing form one to eight carbon atoms, and the beta-substituted acrylonitriles wherein the substituent on the beta carbon atom is an alkyl radical containing from one to eight carbon atoms, containing a minor amount of ammonium nitroso-β-phenyl hydroxylamine.

4. A composition comprising a nitrile selected from the group consisting of acrylonitrile, the alpha-substituted acrylonitriles wherein the substituent on the alpha carbon atom is an alkyl radical containing from one to eight carbon atoms, and the beta-substituted acrylonitriles wherein the substituent on the beta carbon atom is an alkyl radical containing from one to eight carbon atoms, containing ammonium nitroso-β-phenyl hydroxylamine in an amount from about 0.5 to about 1,000 parts by weight per million parts by weight of nitrile.

5. A composition comprising acrylonitrile and from about 0.5 to about 1,000 parts by weight of ammonium nitroso-β-phenyl hydroxylamine per million parts of acrylonitrile.

6. A process for inhibiting the polymerization of an unsaturated nitrile which comprises mixing therewith a minor amount of ammonium nitroso-β-phenyl hydroxylamine.

7. A process for inhibiting the polymerization of alpha, beta-unsaturated nitriles which comprises mixing therewith a minor amount of ammonium nitroso-β-phenyl hydroxylamine.

8. A process for inhibiting the polymerization of a nitrile selected from the group consisting of acrylonitrile, the alpha-substituted acrylonitriles wherein the substituent on the alpha carbon atom is an alkyl radical containing from one to eight carbon atoms, and the beta-substituted acrylonitriles wherein the substituent on the beta carbon atom is an alkyl radical containing from one to eight carbon atoms, which comprises mixing therewith a minor amount of ammonium nitroso-β-phenyl hydroxylamine.

9. A process for inhibiting the polymerization of a nitrile selected from the group consisting of acrylonitrile, the alpha-substituted acrylonitriles wherein the substituent on the alpha carbon atom is an alkyl radical containing from one to eight carbon atoms, and the beta-substituted acrylonitriles wherein the substituent on the beta carbon atom is an alkyl radical containing from one to eight carbon atoms, which comprises mixing therewith ammonium nitroso-β-phenyl hydroxylamine in an amount from about 0.5 to about 1,00 parts by weight per million parts by weight of nitrile.

10. A process for inhibiting the polymerization of acrylonitrile which comprises mixing therewith from about 0.5 to about 1,000 parts by weight of ammonium nitroso-β-phenyl hydroxylamine per million parts by weight of acrylonitrile.

References Cited in the file of this patent
UNITED STATES PATENTS

| | | |
|---|---|---|
| 2,026,894 | Hill | Jan. 7, 1936 |
| 2,125,484 | Bogin | Aug. 2, 1938 |
| 2,232,785 | Howk | Feb. 25, 1941 |
| 2,609,387 | Basdekis et al. | Sept. 2, 1952 |